US005175813A

United States Patent [19]

Golding et al.

[11] Patent Number: 5,175,813

[45] Date of Patent: Dec. 29, 1992

[54] WINDOW DISPLAY SYSTEM AND METHOD FOR CREATING MULTIPLE SCROLLABLE AND NON-SCROLLABLE DISPLAY REGIONS ON A NON-PROGRAMMABLE COMPUTER TERMINAL

[75] Inventors: Michael M. Golding, Palo Alto; Lesley R. Kalmin, Menlo Park; Richard I. Seidner, Woodside, all of Calif.

[73] Assignee: International Business Machines Corporation, Armonk, N.Y.

[21] Appl. No.: 917,798

[22] Filed: Jul. 20, 1992

Related U.S. Application Data

[63] Continuation of Ser. No. 393,599, Aug. 14, 1989, abandoned.

[51] Int. Cl.[5] .......... G06F 3/14; G09G 5/14

[52] U.S. Cl. .......... 395/157; 395/158; 395/162; 340/721

[58] Field of Search .......... 395/157, 158, 162, 153, 395/155, 500 MS; 340/721, 724, 723, 750

[56] References Cited

U.S. PATENT DOCUMENTS 4,642,790 2/1987 Minshull et al. .......... 364/900
4,651,146 3/1987 Lucash et al. .......... 340/721
4,663,615 5/1987 Hernandez et al. .......... 340/721
4,736,308 4/1988 Heckel .......... 364/518
4,782,463 11/1988 Sanders et al. .......... 364/900
4,845,644 7/1989 Anthias et al. .......... 364/521
4,937,036 6/1990 Beard et al. .......... 340/706
4,954,966 9/1990 Mooney et al. .......... 395/157
4,962,475 10/1990 Hernandez et al. .......... 364/900
4,991,118 2/1991 Akiyama et al. .......... 395/144

FOREIGN PATENT DOCUMENTS 0185904 7/1986 European Pat. Off. .

OTHER PUBLICATIONS

Microsoft Windows Version 2.0 Desktop Applications User's Guide, 1987, pp. (2-39)-(2-41), (2-48)-(2-53), (2-55).

IBM Technical Disclosure Bulletin, W. R. Cain et al, *Local Scrolling With a Multiple Partitioned Display,* Mar. 1980, vol. 22, No. 10, pp. 4734-4737.

IBM Technical Disclosure Bulletin, *Scan Line Scrolling Partitioned Display,* Mar. 1988, vol. 30, No. 10, pp. 455-458.

*Primary Examiner*—Gary V. Harkcom
*Assistant Examiner*—Raymond J. Bayerl
*Attorney, Agent, or Firm*—Paul W. O'Malley

[57] ABSTRACT

A windowing system provides an interface between application programs and non-programmable terminal drivers. The system presents logical windows to the applications program, each of which are represented internally by at least two separate parts. The first part includes the border and non-scrollable text for a logical window, while the second part includes scrollable text for the window. Through calls to the display driver, the windowing system manipulates these separate parts so that they are displayed on the screen as a single window.

13 Claims, 3 Drawing Sheets

WINDOW DISPLAY SYSTEM AND METHOD FOR CREATING MULTIPLE SCROLLABLE AND NON-SCROLLABLE DISPLAY REGIONS ON A NON-PROGRAMMABLE COMPUTER TERMINAL

This is a continuation of application Ser. No. 07/393,599, filed Aug. 14, 1989, now abandoned.

BACKGROUND OF THE INVENTION

1. Technical Field

The present invention relates generally to computer system displays, and more specifically to a technique for displaying windows on a computer display having a minimal amount of support for displaying windows.

2. Background Art

The display of information generated by an application program running on a computer system is often important to the perceived usefulness of the application. Poor displays can render an otherwise good application nearly useless, and good displays can help a user make more efficient use of an application.

Windows are often used to display several items of information on a screen at the same time. Windows are separate regions, often separated by borders, which are treated somewhat independently. Different windows may receive output from different applications running concurrently, and a single application may generate output to several windows.

In general, windows may be displayed as tiled or overlapped. Tiled windows are displayed side-by-side horizontally or vertically, or both, with no overlap of their displayed regions. Overlapped windows appear to be stacked one on top of another, much as individual sheets of paper piled on a desktop, with the covered portions of lower windows not being displayed. This type of display is sometimes referred to as the desktop metaphor for displays, or messy desk windowing. Work stations coming into increasingly common use typically have powerful window display systems to support messy desk windowing.

Many mainframe based applications, typically descendants of applications written before work stations started becoming common, are often written for character based, non-programmable terminals. Some terminals designed for tying into larger, central computer systems support rudimentary graphics or character graphics capabilities, or provide for designating portions of the display screen as active for scrolling purposes. The combination of many available terminals and their software drivers often provides the ability to do an extremely limited form of windowing. This form of windowing, referred to as split screen windowing, typically has full width tiled windows stacked vertically on the screen. These windows often have no borders, and only scrolling of the entire window is allowed.

It would be desirable to provide a windowing system for non-programmable terminals which supports messy desk windowing. It would also be desirable to provide a high level interface for application programs which hides the details of the window system and provides callable services similar to those available on work stations. It would further be desirable for such a windowing system to be efficient on non-programmable terminals.

SUMMARY OF THE INVENTION

It is therefore an object of the present invention to provide a window system which supports multiple, independent windows on non-programmable display terminals.

It is a further object of the present invention for such a windowing system to provide operations on individual windows which manipulate these windows while hiding the operating details from an applications programmer.

It is another object of the present invention to provide such a windowing system which operates efficiently on non-programmable terminals.

Therefore, according to the present invention, a windowing system is provided as an interface between application programs and non-programmable terminal drivers. The system presents logical windows to the applications program, each of which are represented internally by at least two separate parts. The first part includes the border and non-scrollable text for a logical window, while the second part includes scrollable text for the window. Through calls to the display driver, the windowing system manipulates these separate parts so that they are displayed on the screen as a single window.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
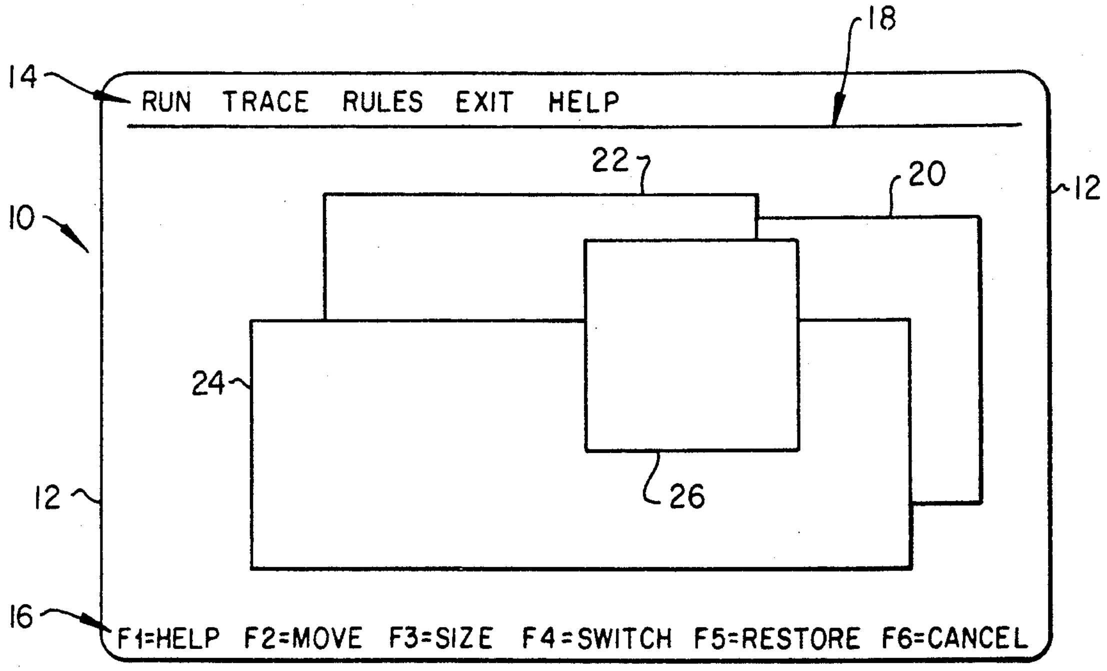
FIG. 1 shows a simplified display illustrating messy desk windowing.

FIG. 1 shows a sample computer display screen illustrating the use of overlapping windows. The display 10 can be nearly any CRT display terminal such as known in the art. The border 12 outlines that region of the display on which visual information is presented to the user. Other portions of a typical computer terminal, such as keyboard, housing, and brightness/contrast controls are not shown.

On the display 10 text 14, 16 can be shown, as well as character graphics 18 used to form lines. Within the display area, 4 windows 20, 22, 24, 26 are shown in overlapping fashion. Each window is a rectangular region outlined by a border, and portions of a window which are overlapped by other windows are not displayed. For simplicity of illustration, the windows shown in FIG. 1 do not contain text, although text is generally present in windows during actual use.

As shown in FIG. 1, window 26 is the uppermost window, followed in decreasing order by windows 24, 22 and 20. Thus, window 20 is on the bottom of the stack, and any portion thereof which is overlaid by any other window is not displayed on the screen 10.

The size and location of the windows 20, 22, 24, 26, as well as their order in the stack, is determined by the user or the applications programs. Preferably, the size and location of the windows can be changed by the user more or less at will, so that any given window's location in the future is indeterminate. The applications programs which write to these windows must be able to do so independently of a window's size or location.

Figure 2:
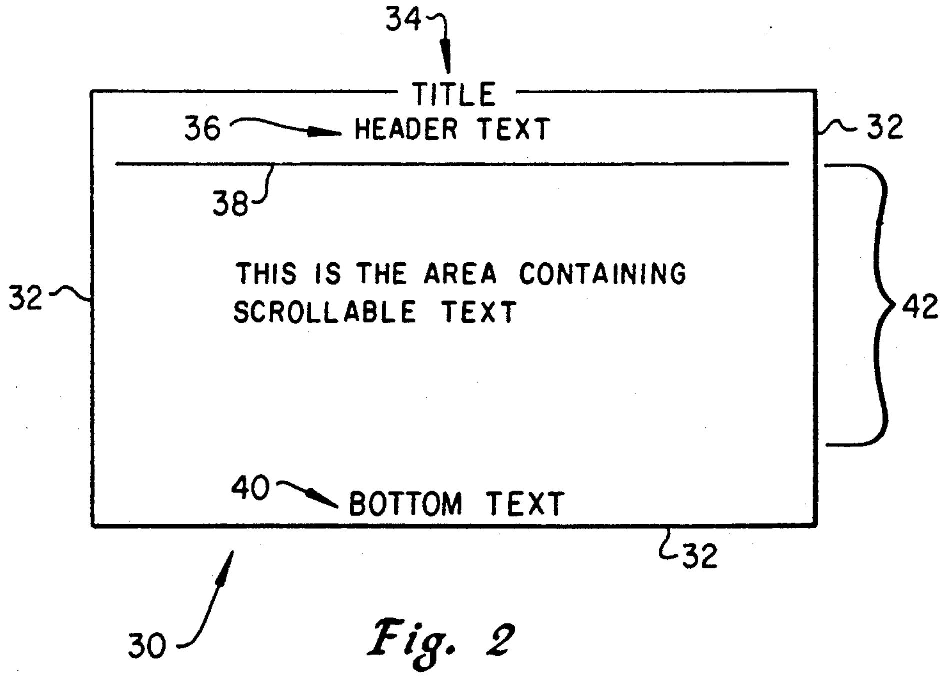
FIG. 2 illustrates several different portions of a single logical window.

Many windows to be displayed have the property that some of the information therein, including the border, remains relatively static. FIG. 2 illustrates a typical window 30 having a border 32 surrounding it and a window title 34 located in the border 32. Header text 36, typically providing informational instructions for the user, is positioned near the top of the window 32. In some window systems, a dividing line 38 may be drawn between the header text 36 and the remainder of the text in the window 30. At the bottom edge of the window 30, bottom text 40 is sometimes used to display further information and instructions to the user. The remainder of the window 30 is a scrollable region 42, consisting of the entire region between the borders 32, below the dividing line 38 and above the bottom text 40. This region 42 is written to by the applications programs, and typically scrolls when it becomes filled with text.

Those portions of the window 30 not in the scrolling region 42, including the border 32, title 34, header text 36, dividing line 38, and bottom text 40, are relatively static. The scrollable region 42 is relatively dynamic, with updated information being written thereto on a fairly regular basis.

Figure 3:
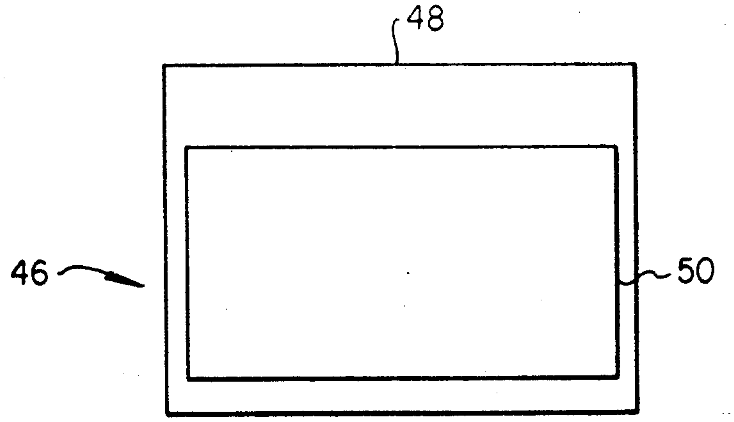
FIG. 3 illustrates the use of two separate regions displayed together to represent a single logical window.

The windows described in connection with FIGS. 1 and 2 can be implemented by an applications programmer in a fairly straightforward manner on most personal work stations and some desktop computers. This is so because many of these machines are designed with built-in support for complex windowing functions. However, non-programmable, character based terminals typically used with mainframe computer systems are not able to support such windowing functions. FIG. 3 illustrates a concept according to the present invention which allows an efficient implementation of messy desk windowing with such non-programmable terminals.

Referring to FIG. 3, a window 46 is divided into an outer region 48 and an inner region 50. The regions 48, 50 are considered as independent regions for display purposes, but are displayed overlapping as shown in order to present a single logical window to a user. The outer region 48 contains non-scrollable information which changes relatively infrequently, while the inner region 50 contains relatively dynamic text. For example, the outer region 48 will include the window border, title, and header and bottom text. The inner region 50 does not contain a border, and consists primarily of scrollable text information.

The character based, non-programmable terminals typically utilized with the present invention, together with their software drivers, typically provide scrollable placement of text within a defined region. However, they do not provide for scrolling of a part of a region while retaining the remainder of the region intact. Thus, defining a logical window to be two independent regions allows the scrollable portions of the display to be driven independently from the non-scrollable portions. This allows for greatly increased efficiency when writing scrollable text to a window. The terminals and drivers also handle the extended data stream at the region boundaries, so that fonts, color, blinking, and other display attributes are correctly handled within each region. Some terminals are capable of supporting graphics and animation to various degrees.

As will be described in more detail below, a window may have more than two independent regions. For example, a single logical window could have an outer region containing relatively static, non-scrollable text, and two or three separate scrollable regions within its boundaries. The separate scrollable regions are preferably placed adjacent to each other with no overlap. Some logical windows may not include both scrollable and non-scrollable regions. For example, a window could contain only fixed information which is not changeable by the user, and such a window would not need an inner, scrollable region 50.

Figure 4:
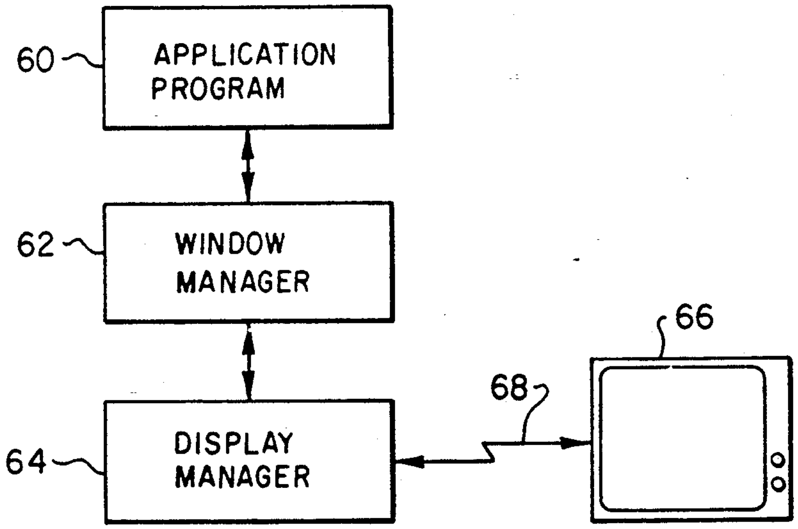
FIG. 4 is a block diagram illustrating a system for displaying windows on non-programmable terminals.

FIG. 4 is a high level block diagram illustrating a preferred system for performing windowing. An application program 60 performs output relative to a terminal by making procedure calls to a window manager subsystem 62. The window manager 62 is a collection of procedures and data structures, described below in more detail, which manages the function of the logical windows which the application program 60 expects to see. The window manager is in communication with a display manager 64 which in turn communicates with a display terminal 66 over a data link 68. The display terminal 66 is often located at a site remote from the central computer system, so the data link 68 is typically a serial communications link which may include one or more telephone or satellite links.

The display manager 64 is a software subsystem which resides in the main computer, and drives the display terminal 66. The display manager 64 sends characters to the terminal 66 to be displayed, and also sends control sequences to the terminal 66 to position the cursor, highlight text, and perform other display functions. Information entered into the terminal 66 by a user is received by the display manager 64 and transferred to the application program 60 through the window manager 62. An example of a typical display manager 64 subsystem suitable for use with the present invention is a product known as GRAPHICAL DATA DISPLAY MANAGER (GDDM), a product which is available from IBM and currently in wide use.

Figure 5:
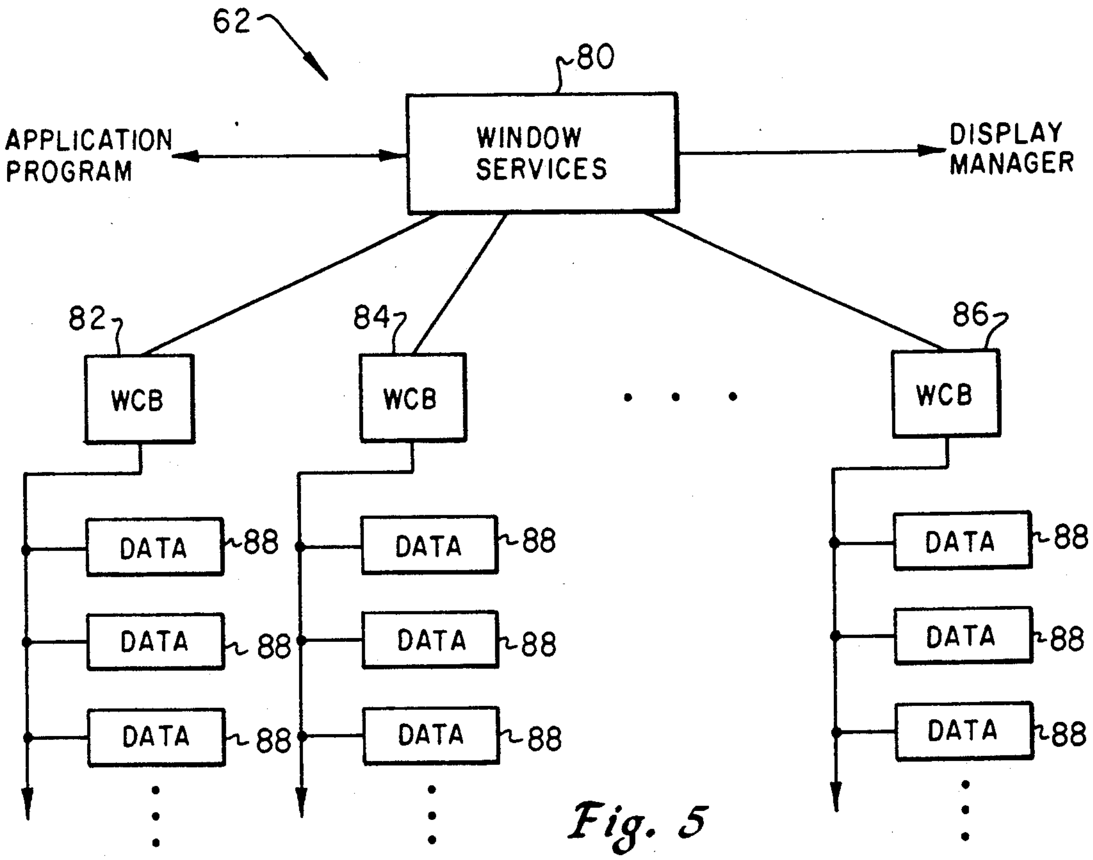
FIG. 5 is a block diagram of a window manager system.

FIG. 5 illustrates more details of the window manager 62. Communication with the application program 60 and the display manager 64 are made through window services 80. Window services 80 is a collection of procedures, callable by the application program, which in turn make procedure calls to the display manager subsystem. Pseudocode descriptions of the operation of some of the more important procedures within the window services 80 are set forth in the Appendix, and are described in more detail below.

The window services procedures 80 access a plurality of data structures referred to as window control blocks 82, 84, 86. Each window control block corresponds to one logical window, and contains all of the information necessary to generate and control both the scrollable and non-scrollable portions of a logical window. Whenever a new logical window is created by the application program, a new window control block is allocated and made available to the window services 80. When a window is deleted, the corresponding window control block is deallocated.

In addition to header information, each window control block 82, 84, 86 contains pointers to one or more data objects 88. These data objects 88, also referred to as clusters, contain the text which is sent to the display manager for display on the terminal. In one embodiment, the application can place data into the data objects 88, from which it is extracted by the window service 80 for transmission to the display manager. As an alternative, using a somewhat more object-oriented approach, the application writes data to a logical window by calling a window service 80, so that the application has no direct access to the data objects 88. Different data objects 88 are used for different portions of a logical window as shown in more detail in FIG. 6.

Figure 6:
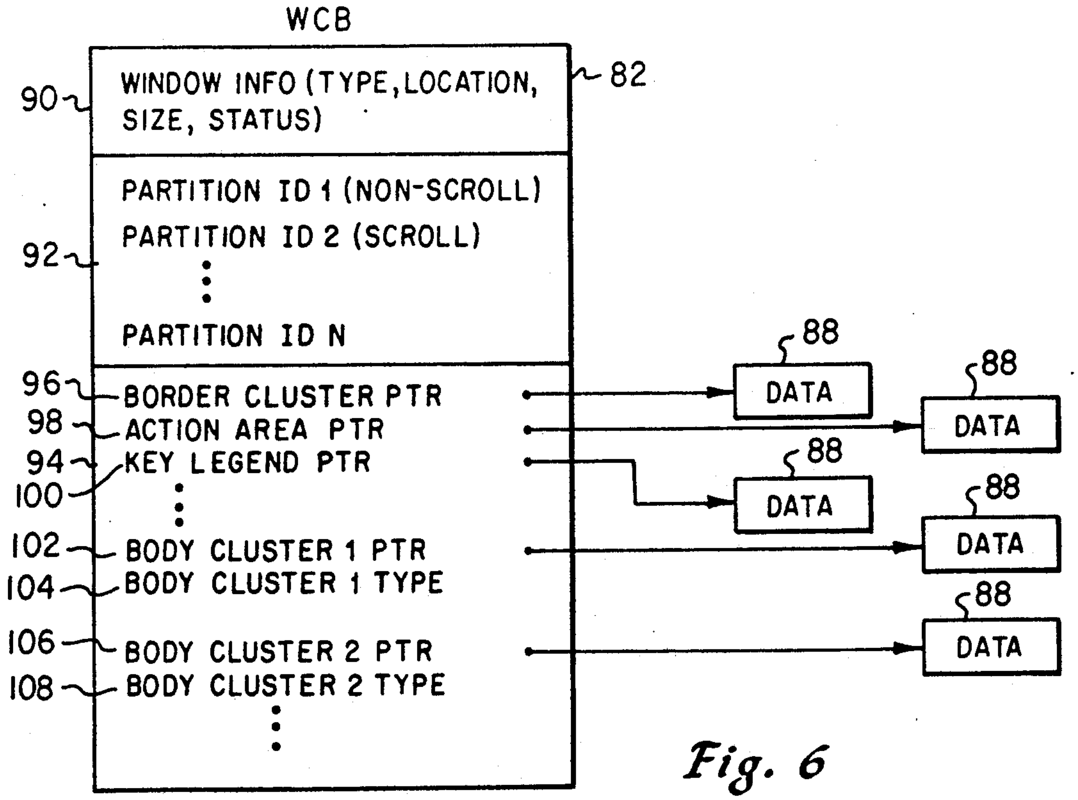
FIG. 6 illustrates details of a window control block.

Referring to FIG. 6, a preferred internal structure for one window control block 82 is shown. One portion 90 of the window control block 82 contains general information relevant to the logical window. This information 90 includes a window type, such as primary window, pulldown window, or pop-up window. The location of the window is included, which information generally comprises X and Y coordinates for one corner of the window. The size of the window, in terms of number of rows and number of columns is also included, as is various window status information. Miscellaneous information pertaining to the logical window, such as a window title if there is one, and the identity of the application program associated with this window, can also be included here.

A next portion 92 of the window control block 82 includes identifiers for the partitions used to make up the logical window. A partition is a logical region used by the GDDM display manager, and corresponds to the regions 48, 50 described in connection with FIG. 3. Thus, in a preferred embodiment, one partition is dedicated to the non-scrollable region 48 of a logical window 46, with the remaining partitions being used for one or more scrollable regions 50. A typical window will have one non-scrollable partition and one scrollable partition. Additional scrollable partitions are normally needed only for complex scrolling operations, such as may occur when row or column headers are to remain static within the scrollable region.

A data portion 94 contains pointers to data clusters 88 which, as described above, contain the text to be placed into the logical window. The data may be organized in any manner convenient for use with the display manager 64, with the arrangement shown in FIG. 6 being useful for use with a GDDM display manager 64.

In the data portion 94, several pointers to data located in the non-scrollable partition are first. A border cluster pointer 96 points to a cluster 88 containing the field definitions, described below, containing all information necessary to display the border of the logical window. An action area pointer 98 points to a cluster 88 containing header text 36, and a key legend point 100 points to a cluster 88 containing bottom text 40. Additional pointers (not shown) can point to other data clusters 88 defining other non-scrollable text regions. If a particular window does not have a particular feature such as an action area or key legend, the corresponding pointers are simply set to NULL.

Following the pointers 96, 98, 100 to data contained in the non-scrollable partition, a first body cluster pointer 102 points to a data cluster 88 containing data to be displayed in the scrollable region. A type identifier 104 for the first body cluster indicates whether that region is currently scrollable, and can be used to indicate other information about the associated data cluster 88. Additional body cluster pointers, such as body cluster 2 pointer 106 are used in conjunction with additional scrollable partitions beyond the first scrollable partition. Each of these other body clusters has an associated body cluster type identifier 108 also.

Figure 7:
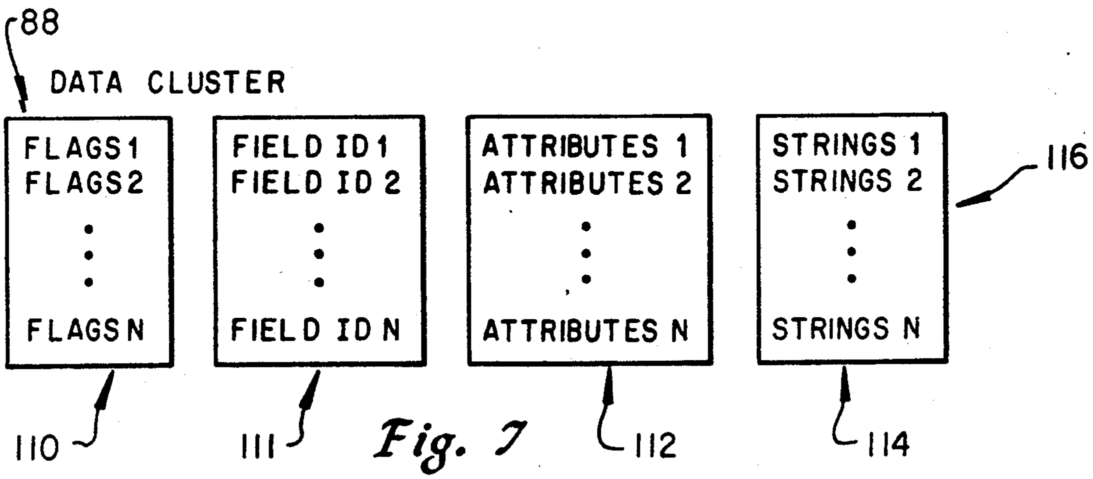
FIG. 7 illustrates details of a data cluster.

Referring to FIG. 7, a preferred organization for a data cluster 88 is shown. Each data cluster 88 has one or more fields, with each field typically corresponding to one line of text to be displayed. The information necessary to display each field is arranged into groups, so that there are formed a flags group 110,, a field identifiers group 111, an attributes group 112, and a strings group 114. As shown in FIG. 7, each adjacent entry in an attribute group 110, 111, 112, 114 corresponds to one field, so that a first field 116 includes the first entry in each of the groups 110, 111, 112, 114.

The flags entry for each field contains various status flags for that field. The field identifier entry for each field contains a symbolic name for that field, to simplify reference thereto by the application if desired. The attributes entry for a field contains information for the display manager 64 used to display the text of each field, such as size, color, and highlighting information. The strings entry for each field is preferably a pointer to a string containing the text for that field.

The window services 80 are able to easily extract from a window control block the data needed to be sent to the display manager 64. Using the described system allows a relatively straightforward implementation of the functions necessary for high level control of logical windows. These functions include, but are not limited to, functions for creating and destroying windows, writing text to windows and reading input text entered by a user, and sizing, moving, and scrolling windows. Pseudocode for performing these important functions is set forth in the attached Appendix. Henceforth follows a brief description of the functioning of the pseudocode for each of these high level window functions.

The CreateWindow function creates a window from the information passed to it in the Window Control Block (WCB). The contents of the WCB are validity checked (line 100). The outer partition and the contained page are created (lines 101-10)). The new window information is recorded in a new MAPREC record at the end of the list of windows (line 103). A MAPREC record simply maps partitions to windows, and a linked list of all such mappings is retained for reference as needed. The window border characters are set according to the device type in use and its capabilities (lines 104-108). The window contents are then created by looping through the WCB contents by cluster (lines 109-112). This completes the creation of the outer partition, and a nearly identical procedure is now used to create the inner partition, which has no border (lines 113-119). A flag is set in the WCB to show that the window has been created and is currently in the open state.

The DestroyWindow function destroys a window, freeing the associated storage and display manager constructs. The validity of the WCB is checked (line 100). Then, looping through each cluster, window contents are deleted, finally freeing the storage for the clusters themselves (lines 101-106). The MAPREC storage and display manager constructs are deleted (partitions and pages), (lines 107-108). Finally, the WCB storage is freed (line 109).

The WriteText function creates new fields and/or places text in existing fields. The WCB is checked for validity (line 100). The outer partition is made current and its first cluster is pointed to (lines 101-102). Then looping through each of the clusters, each cluster is examined to see if any fields need be created or replaced (lines 103-114). One of the optimizations used in this design is the placement of WCB clusters in order, so that the WriteText and related functions can simply fall through the list of clusters, and by doing so, easily handle the switch from outer partition clusters to inner partition clusters (line 105). This is done by looping through each of the fields in each cluster (lines 106-113). A WriteText flag is searched for (having been set by the calling program in order to signal this change in field text), and if it's set (line 107), then the display commands are issued to change the field text and/or create new fields if required (lines 108-109). If these operations succeed, then the WriteText flags are reset in the WCB, else an error code is returned (lines 110-112).

The ReadWindow function causes all of the display changes to be displayed at the device and allows the user to interact with the program. It then notifies the window owners of the changes and/or interactions. Programmed function key information is sent first to the owner of the current window. Windows in which text was changed are also sent messages that a change occurred in their window. WCB fields for which changes occurred are marked with a Modified flag. A Special Input Field designation exists as a convenience for windows which only react to an input string in a designated field.

ReadWindow first looks for the current partition, and if one is not found it returns to the caller (lines 100-101). Otherwise, it issues a display manager command to write any changes to the display and allow the user to interact (line 102). The cursor position is then determined and, if it was not in a defined partition, it is placed in the top partition (lines 103-105). A temporary list of partitions currently on the device screen is created, and matched against the list of all WCBs (lines 106-111). The current partition is placed at the front of the list of WCBs (line 110).

The WCBs are then each handled by the following loop (lines 112-128). Closed or minimized windows are ignored, since no changes will have to appear in them (line 113). The body partition is made current, and a loop determines if any of the fields have been modified, in which case the WCB flag for that field is marked as modified (lines 114-119). The same loop is then repeated for the outer partition (lines 120-125). If the Special Input Field of the WCB has been set, then the field text is obtained for that modified field (line 126). The results of the read operation are passed to the window owner (line 127).

The SizeWindow function resizes the window on the display and pops it to the top of the viewing order. The WCB is checked for validity (line 100). The inner partition is sized first (lines 101-108). This is accomplished by first checking to see if it has a body partition and, if so, sizing it in relation to the outer partition. If the new window is too small for the body to appear at all, the partition is made invisible (lines 104-105).

The outer partition is then resized and recreated (lines 108-115). The WCB is updated with the requested position and dimensions (lines 108). A display manager command is issued to resize the outer partition (line 109). The partition page is recreated (line 110). The outer partition's contents are recreated according to the new dimensions (line 111-115). Finally the window is made current by making all of its partitions current, if it is not already on top of the viewing order (lines 116-118).

The MoveWindow function moves the window and pops it to the top of the viewing order. The WCB is checked for validity (line 100). The new position of the inner partition is calculated based on the destination and offset from the outer partition (lines 101-103). If the window is not closed, then the display manager command is issued to move the partitions (lines 104-107). The window is placed at the top of the viewing order if it is not already there (lines 109-110).

The ScrollWindow function scrolls the contents of the window and pops it to the top of the viewing order. The WCB is checked for validity (line 100). If there is no body partition for this window, then the function returns, since only window bodies are scrolled (lines 101-102). The inner partition is made current (line 103). Calculations are performed to determine which data will be displayed after the scrolling operation (line 104). The operation then continues by performing the required display manager commands that achieve the scrolling result (lines 105-117). The WCB is updated with the new positional information, and the window is placed at the top of the viewing order (lines 18-121).

Other window control functions can be implemented in a straightforward manner using the functions described above or techniques similar to those used in such functions.

As will be appreciated by those skilled in the art, a window manager system has been described which provides high level, fully functional support for messy desk windowing on a non-programmable, character based terminal. Such a system can be used with mainframe computer based applications for which windowing has not heretofore generally been available. The windowing system as described can easily be provided as a package which can be used by numerous application programs. Using the techniques of the present invention, windows may be manipulated efficiently on a terminal which is not normally designed to support their use. Various types of windows, such as pop-up and pulldown windows, can be implemented using the described techniques.

While the invention has been particularly shown and described with reference to a preferred embodiment, it will be understood by those skilled in the art that various changes in form and detail may be made therein without departing from the spirit and scope of the invention.

* * * * *

```
------------------------------------------------------
CreateWindow       /* Creates a window on the screen from information in
                      the WCB */

100 Check validity of WCB passed as input to the function
    /* creating outer partition */
101 do display call to define outer partition
102 do display call to  create outer partition page to be
       same size as outer partition
103 create new MAPREC and append to end of chain
104 replace border corners and horizontal lines according to device
        characteristics
105 IF we have symbols
106    THEN set symbol-set attribute for border fields and use
            programmed-symbol corners
107    ELSE use connecting horizontal lines and emulator corner chars
108 place proper characters into corners
109 LOOP  over outer partition clusters
110     IF cluster pointer non-null
111          THEN draw part of window described by cluster
112 END LOOP
    /* create inner partition */
113 do display call to define body (inner) partition
114 do display call to define underlying page for body partition
      to size in WCB or default to partition size
115 create new MAPREC and append to end of chain
116 LOOP over fields in body cluster
117     do display call to define field
118     do display call to display text  in field
119 END LOOP
120 set WindowOpen flag in WCB

------------------------------------------------------

------------------------------------------------------
DestroyWindow         /* Destroy a window and its WCB, freeing
                         associated storage */

100 Check validity of WCB passed as input to the function
101 LOOP over each cluster in the WCB
102      LOOP over each field in the cluster
103           IF text string exists, free it
104      END LOOP
105      free cluster storage
106 END LOOP
107 point to global storage MAPRECs
108 remove MAPREC of partitions which belong to WCB
109 free WCB storage

------------------------------------------------------
```

```
-------------------------------------------------------
WriteText         /* Create new fields and/or place text in existing
                     fields */

Check validity of WCB passed as input to the function
Make outer  partition current
Point to first cluster in partition
LOOP over clusters in the partition
     Point to first field in the cluster
     IF pointing to body cluster, make inner partition current
     LOOP over  fields of the cluster
          IF WriteText flag set
             THEN  (rewrite string, padding with blanks as necessary
                    do display command to change text
                    IF display call successful
                         THEN reset flag
                         ELSE return with error code )
     END  LOOP
END  LOOP

-------------------------------------------------------
```

```
-------------------------------------------------------
ReadWindow         /* Read input from screen, update WCB */

Query the current partition
IF no partition current THEN return
Write/read screen with display manager command
Query cursor information
IF the  cursor is not in any partition
     THEN place it in top partition
Create a temp list of WCBs with partitions currently on the screen
Point to global list  which maps partitions to WCBs (MAPRECs)
    /* Create array of pointers to WCBs for current windows */
    /* placing current partition first in the array.        */
    /* Choose only outer partitions to get only one WCB per window */
LOOP over MAPRECs
     IF  partition is current, place at front of array
     If pointing to outer partition, place corresponding WCB in array
END  LOOP
LOOP over WCBs in array
     IF window closed or minimized, loop to next WCB
     make body  partition current
     query modified fields, placing field identifiers in a list
     LOOP over body partition modified fields
          locate WCB field pointer for modified field
          set Modified Field flag
     END LOOP
     make outer partition current
     query modified fields, placing field identifiers in a list
     LOOP over outer partition modified fields
          locate WCB field pointer for modified field
          set Modified Field flag
     END LOOP
     IF window has Special Input Field send input string directly
          to owner and clear input field
     post WindowEvent message to window owner
END LOOP

-------------------------------------------------------
```

```
-------------------------------------------------------
SizeWindow        /* Resizes the window on the screen and pops it to the
                     top of the viewing order */

Check validity of WCB passed as input to the function
    /* Size inner partition */
IF body partition exists
    THEN ( calculate offset from outer partition
           update WCB with new body partition position,
                  based on destination and offset
           IF new window size is too small for body to appear
               THEN (make it invisible
                     push it to the bottom of the viewing order
                     set minimized flag )
           do display command to size body partition )
    /* Size outer partition */
update WCB with new outer partition position  and dimensions
do display command to size the  outer partition
delete the partition page and recreate it with new dimensions
    /* Recreating outer partition */
Determine if title field exists
Save corner characters and one character from each side
update WCB with new outer partition dimension and size
recreate border sides with saved characters
recreate border corners with saved characters
    /* Pop to top */
Query current top partition.
IF move window is not on top
    THEN place body and outer partitions on top of viewing order

-------------------------------------------------------


-------------------------------------------------------
MoveWindow        /* Moves the window on the screen and pops it to the
                     top of the viewing order */

Check validity of WCB passed as input to the function
IF body partition exists
    THEN ( calculate-offset from outer partition
           update WCB with new body partition position,
                  based on destination and offset
           IF window is not minimized
               THEN do display command to move body partition )
update WCB with new outer partition position
do display command to move outer partition
Query current top partition.
    /* Pop to top */
IF move window is not on top
    THEN place body and outer partitions on top of viewing order

-------------------------------------------------------
```

```
----------------------------------------------------------------
ScrollWindow      /* Scrolls the body of the window and pops it to the
                     top of the viewing order */

Check validity of WCB passed as input to the function
   /* Set up necessary variables */
IF body partition does not exist
    THEN return      /* only body scrolls */
make body partition current
determine row number of last field in the body cluster
   /* handle page scrolling, which includes left/right scrolls */
IF scrolltype is PAGESCROLLABLE or left/right scroll requested
THEN (query position of partition relative to the page
      determine new page position
      do display command to move window relative to the page )
   /* handle scrolling for windows which don't fit on a page */
IF scrolltype is BIGSCROLLABLE
THEN ( determine which row appears at top of window
       search field row numbers for first filed of this top row
       /* there may be more than one field per row */
       determine which row should appear at window bottom
       LOOP over fields between first and last row
            copy field attributes into temporary array
            replace row number with window row number
            write field text
       END LOOP
update BodyTopLine in WCB
   /* Pop to top */
Query current top partition.
IF move window is not on top
    THEN place body and outer partitions on top of viewing order

----------------------------------------------------------------
```

We claim:

1. In a data processing system including a non-programmable display terminal capable of displaying a plurality of independent scrollable partitions and a plurality of independent non-scrollable partitions and a processing unit, a method for displaying overlapping logical windows on the non-programmable display terminal, comprising the steps executed by the data processing system of:

responsive to creation of a logical window by an application program, allocating one of a plurality of window control blocks to the logical window, wherein the window control block includes pointers to a plurality of preexisting data clusters;

filling a plurality of partition identifiers in the window control block, including at least a first partition identifier corresponding to a non-scrollable partition to provide a boundary for the logical window and a second identifier corresponding to a scrollable partition for the logical window;

for each non-scrollable and scrollable partition, setting a pointer in the window control block to a data cluster for the partition defining its attributes for overlapping the scrollable partition on the non-scrollable partition;

generating the non-scrollable partition corresponding to the first partition identifier for the logical window on the non-programmable display terminal;

generating the scrollable partition corresponding to the second partition identifier for the logical window on the non-programmable display terminal; and overlapping the non-scrollable partition to present the logical window on the non-programmable display terminal to a user.

2. The method of claim 1, further comprising:

generating an additional partition corresponding to an additional scrollable partition identifier for the logical window on the non-programmable display terminal wherein the additional partition overlaps the non-scrollable partition to present the logical window on the non-programmable display terminal to the user.

3. The method of claim 1, wherein the non-scrollable partition includes a window border, and wherein the scrollable partition is displayed at a location positioned wholly within boundaries of the non-scrollable partition, whereby the window border surrounds the scrollable partition.

4. The method of claim 3, wherein the non-scrollable partition further includes top-non-scrollable text and bottom non-scrollable text, and wherein the scrollable partition is displayed at a location between the top text and the bottom text.

5. The method of claim 1, wherein said non-scrollable partition comprises a plurality of subregions, wherein text for displaying each subregion is stored in a separate data element.

6. A display system for use in a data processing system, comprising:

a non-programmable display terminal supporting partitions of a display screen as active and as non-active for scrolling;

a plurality of data structures for supporting display of a logical window;

means responsive to an application program executing on the data processing system creating a logical window for allocating an unallocated one of the data structures to the logical window;

means responsive to allocation of a data structure corresponding to a logical window for display on the non-programmable display terminal, for assigning to said data structure data identifying scrollable and non-scrollable partitions, and including pointers into data clusters specifying attributes and contents of the scrollable and non-scrollable partitions;

means for writing a first non-scrollable partition to a location on the display screen and for writing at least a first scrollable partition to the display screen where it overlaps the first non-scrollable partition; and a window manager having procedures callable by an application program, wherein the procedures communicate with said means for writing to display data on the non-programmable terminal and wherein the scrollable and non-scrollable partitions are filled upon allocation of a data structure to a logical window.

7. The system of claim 6, wherein any scrollable partition of data is displayed in a defined region which is wholly contained within a defined region used to display the first non-scrollable partition.

8. The system of claim 6, wherein the first non-scrollable partition includes a border to be displayed around the periphery of the defined region used to display non-scrollable partitions.

9. The system of claim 8, wherein the non-scrollable partition further includes text to be displayed adjacent to top and bottom borders of its defined region, and further wherein the defined region used to display scrollable partitions is wholly contained within an area between the text displayed adjacent to the top and bottom borders.

10. The system of claim 6, further comprising:

an additional scrollable partition contained within said data structure, wherein said additional scrollable partition is displayed in a defined region different form that used to display the first scrollable partition.

11. The system of claim 10, wherein the defined regions used to display the scrollable partition and the additional scrollable partition are both wholly contained within a defined region used to display the non-scrollable partition.

12. The system of claim 11, wherein the defined region used to display the scrollable partition and the additional scrollable partition are positioned adjacent to each other with no overlap.

13. The system of claim 6, wherein the non-scrollable partition is subdivided into sub-portions, each sub-portion being stored separately within said data structure.

* * * * *